G. S. MEIKLE.
THERMOS BOTTLE.
APPLICATION FILED NOV. 4, 1919.
1,388,189.
Patented Aug. 23, 1921.
Fig. 1.
Fig. 2.
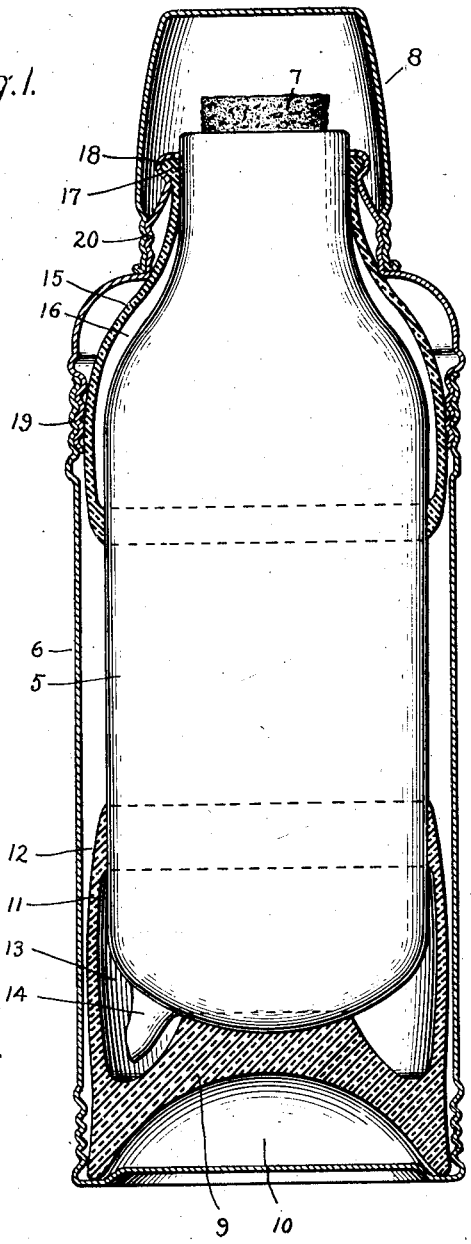
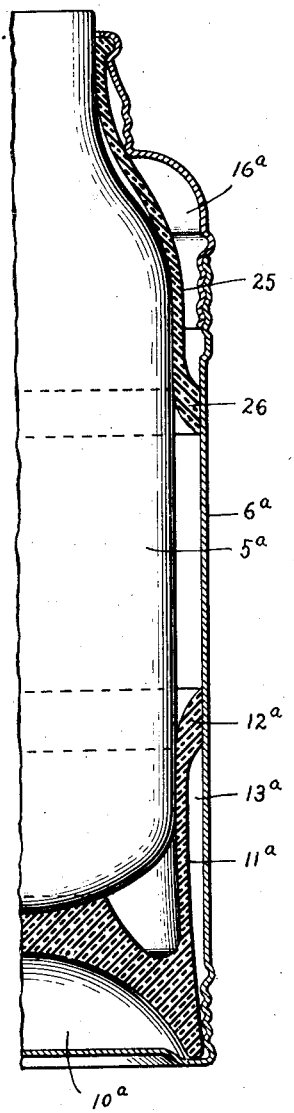
Inventor.
George S. Meikle
by Alfred V. Bobst
Atty.

UNITED STATES PATENT OFFICE.

GEORGE S. MEIKLE, OF NEW YORK, N. Y.

THERMOS BOTTLE.

1,388,189.   Specification of Letters Patent.   Patented Aug. 23, 1921.

Application filed November 4, 1919. Serial No. 335,641.

*To all whom it may concern:*

Be it known that I, GEORGE S. MEIKLE, a citizen of the United States, residing at New York, county of New York, State of New York, have invented certain new and useful Improvements in Thermos Bottles, of which the following is a specification.

The present invention relates to thermos bottles of the type comprising a double walled glass filler mounted in a container or casing, the air being exhausted from between the glass walls to form a vacuum between them as is well understood.

Such glass walled fillers are frangible and when broken, due to the vacuum between the walls, they fly into pieces after the manner of an incandescent lamp bulb. It is accordingly necessary that the glass fillers be mounted in their casings or holders so as to be protected from shocks and blows which may cause them to break, and the object of my present invention is to provide an improved structure and arrangement for supporting such fillers in their containers or casings whereby they will be suspended in a manner which prevents shocks or blows administered to the containers from reaching the fillers to such an extent as to cause them to break.

For a consideration of what I believe to be novel and my invention, attention is directed to the accompanying description and the claims appended thereto.

In the drawing, Figure 1 is a vertical sectional view of a thermos bottle embodying my invention, and Fig. 2 is a similar view of a modification.

Referring to the drawing, Fig. 1, 5 indicates the filler of a thermos bottle, the same comprising a glass vessel having spaced walls from between which the air has been exhausted to provide a vacuum, and 6 indicates the container or casing which may be made of metal, fiber or other suitable material. The neck of vessel 5 may be closed by a stopper 7 over which fits a cup 8, which screws onto the neck of the container or casing 6.

Now, according to my invention, I support the glass filler within the container or casing through the medium of a yielding resilient means which provides air pockets under the filler and on its sides at both the bottom and the neck of the same so that I have in substance air cushions for absorbing shocks and distributing them over a large area. The casing or container is of greater diameter than the glass filler and the arrangement is such that the yielding means tends to position the filler in the middle of the container and maintain it there. The arrangement is also preferably such that a partial vacuum is created between the filler and the supporting means which provides a suction for holding the filler in position.

In Fig. 1 of the drawing, 9 is an inverted cup shaped bottom support made of resilient or yielding material such as rubber, for example, and providing beneath the filler an air pocket 10. The upper surface of bottom support 9 engages the central portion of and is shaped to conform to the contour of the bottom of filler 5, and its rim fits snugly around the edge of the bottom of casing 6. Preferably the bottom is inset so it rests on a support on which it may be placed only around its edge, and this provides a groove 6ª for the rim or support 9 to rest in. Formed integral with the rim of cup 9 is a sleeve 11 which extends up around the bottom portion of filler 5, being slightly larger in diameter than the filler and at its upper edge it is turned inward or thickened somewhat, or both, so as to grip tightly the surface of the filler as indicated at 12. This forms an annular air pocket 13 around the outer edge of the bottom of filler 5, the lower portion of which is more particularly intended to accommodate sealing off tip 14. Cup 9 and sleeve 11 are preferably molded from rubber and formed as one integral structure, although they may be molded separately if found desirable.

At the neck of the filler I provide a resilient or yielding side support 15, also preferably made of rubber, which extends from the top of the neck down the side of the filler a suitable distance. This support is also arranged to provide an air pocket or pockets, and to this end it is so shaped or molded that at its two ends it engages tightly the surface of the filler but at its central portion it is spaced therefrom. This provides an annular air pocket or pockets 16. Support 15 is preferably provided with an enlarged ring 17 at its upper end which rests in a bead 18 at the top of casing 6 and the top of filler 5 is located under this ring. The casing 6 is jointed at 19 to permit assembling the filler in it and when the upper part is screwed down the filler is held down on bottom support 9 by ring 17. Support 15 may engage container or casing 6 at one or more points as indicated at 20.

In Fig. 2 I have shown a modified arrangement of support which is similar to that shown in Fig. 1 except that air pockets 13 and 16 are located between the supports and casing instead of between the supports and filler. In this arrangement sleeve 11ᵃ is so molded or shaped that it extends up along the surface of filler 5ᵃ gripping it tightly and at its upper end turns outwardly to present a flat surface 12ᵃ which rests against the inner surface of container 5ᵃ. This forms an annular air pocket 13ᵃ. Support 15ᵃ is likewise arranged to grip filler 5 at an intermediate point 25 and at its lower end it is turned outwardly to engage casing 6ᵃ at 26. This forms an annular air pocket 16ᵃ.

With the above described arrangements it will be seen that I provide an air pocket under the bottom of the container, and air pockets at the sides, and these pockets form cushions or shock absorbers. It will also be evident that various shapes of supports may be utilized in carrying out my invention, the same providing such air pockets and such arrangements of air pockets as may be found desirable in any particular case. When the casing receives a blow, for example by being dropped, the shock can reach the glass container only by being transmitted through the yielding support or the air cushions, and in any event it will be distributed over a large area and to a considerable extent dissipated.

Also when the container is pushed down on the bottom support it forces air out of the pockets 10 and 13 in Fig. 1, or pockets 10ᵃ and 13ᵃ in Fig. 2, and when the pressure is relieved the resiliency of the support will push the container upward. Due to the fact that the support grips the container tightly air cannot readily leak back again into the pockets. As a result a partial vacuum is formed in such pockets. The partial vacuum in pockets 13 or 13ᵃ acts to suck or draw the container down onto the support 9 or 9ᵃ, and the partial vacuum in pockets 10 or 10ᵃ acts to suck or draw support 9 toward the bottom of casing 6 or 6ᵃ, and hold it there. This aids materially in holding the container centered within the casing.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a thermos bottle, a container, a frangible filler, and yielding means for supporting the filler in the container said means providing air pockets under the bottom and at the side of the filler against which the filler rests and which serve to form air cushion supports for the filler.

2. In a thermos bottle, a container, a frangible filler, and yielding means for supporting the filler in the container, said means providing air pockets under the bottom of the filler and at the side at both its top and bottom against which the filler rests and which serve to form air cushion supports for the filler.

3. In a thermos bottle, a container, a frangible filler, and yielding means for supporting the filler in the container, said means providing an air pocket under the bottom of the filler and an air pocket on the side of the filler and adjacent its bottom, said filler being supported on said air pockets.

4. In a thermos bottle, a casing, a support at the bottom thereof, comprising an inverted cup shaped member made of yielding material, and a vertically extending sleeve, and a filler the bottom of which rests on said cup shaped member, said sleeve extending along the side of the filler and engaging it over a limited area, said inverted cup shaped member forming an air cushion support for the filler.

5. In a thermos bottle, a casing, a filler, and means for supporting the filler within the casing to protect it from shocks, said means comprising an inverted cup shaped air cushion support located at the bottom of the casing and made of yielding material, and a sleeve formed integral therewith and projecting upwardly from said support, the bottom of said filler resting on said cup shaped support and said sleeve engaging said filler on the side.

6. In a thermos bottle, a casing, a filler, means at the bottom of the casing for supporting the filler, and means at the top of the casing for supporting the filler, said last named means comprising a yielding sleeve which engages the filler at spaced points to provide an air pocket around the upper portion of the filler, thereby providing an air cushion support for the filler.

7. In a thermos bottle, a casing, a filler, and means for supporting the upper end of the filler in the casing, said means comprising a resilient ring which engages the top of the filler and an annular sleeve depending therefrom and forming an air cushion support for the filler.

8. In a thermos bottle, a casing, a filler, and means for supporting the upper end of the filler in the casing, said means comprising a resilient ring which engages the top of the filler and an annular sleeve which depends therefrom and engages the filler and casing at spaced points to form an air pocket, thereby providing an air cushion support for the filler.

9. In a thermos bottle, a molded rubber support comprising an inverted cup shaped member and an integral sleeve projecting upwardly from the rim of the member, the outer surface of the bottom of said member being adapted to receive the bottom of a filler and the sleeve being adapted to engage it on the side.

10. In a thermos bottle, a casing, an inverted cup-shaped yielding support in the bottom of the casing, a filler resting on said support, which support provides an air pocket under it, a sleeve formed integral with said support and projecting up around said filler, said sleeve gripping the filler at its end to form an air pocket at the side of the filler, and a support for the upper end of the filler comprising a sleeve having a bead at its upper end which rests on the neck of the filler and a portion at its lower end which engages the filler, the intermediate portion of said sleeve being spaced from the filler to form an air pocket.

In witness whereof I have hereunto set my hand this seventeenth day of October, 1919.

GEORGE S. MEIKLE.